Nov. 7, 1933.  E. BAUSCH ET AL  1,934,582
PROJECTION APPARATUS
Filed June 18, 1931
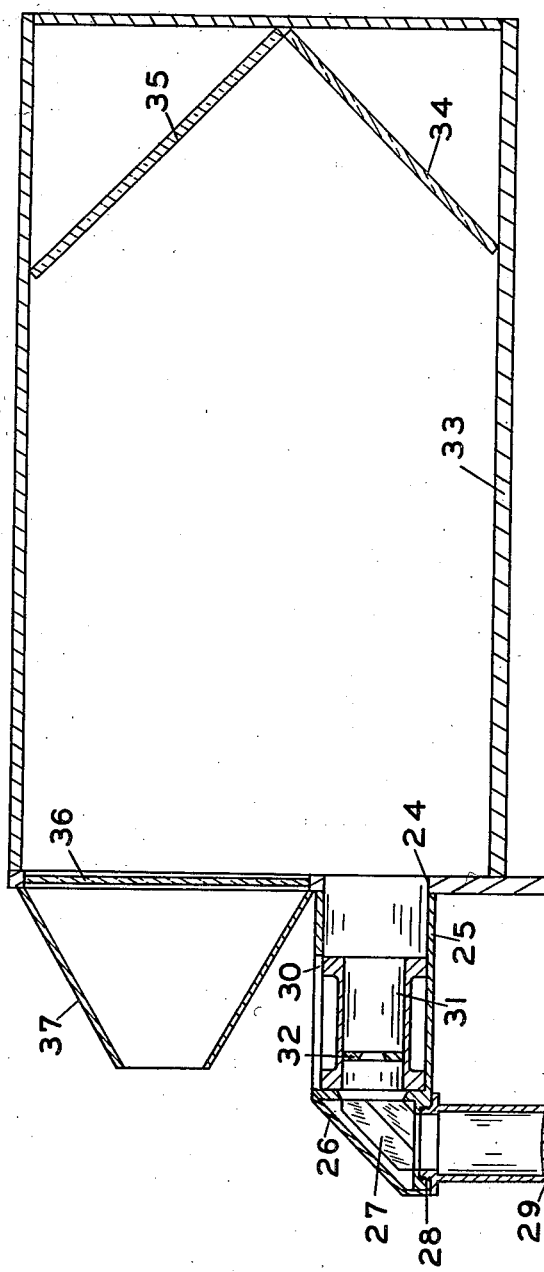
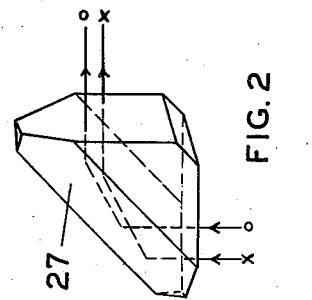
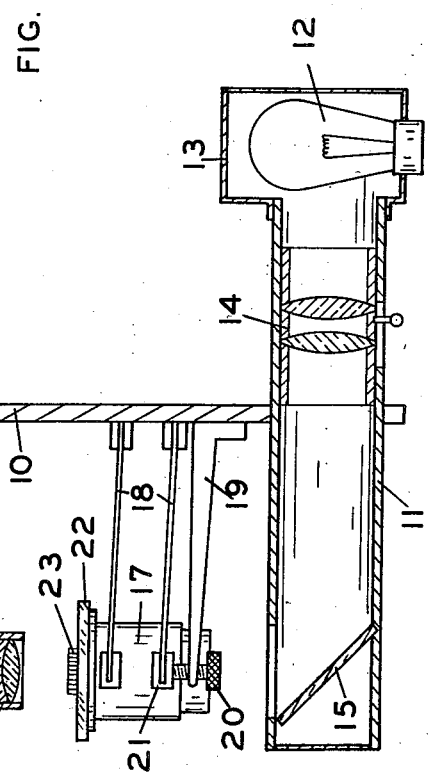
EDWARD BAUSCH
HENRY F. KURTZ
INVENTORS
BY *G. A. Ellestad*
ATTORNEY Patented Nov. 7, 1933

1,934,582

UNITED STATES PATENT OFFICE 1,934,582

PROJECTION APPARATUS

Edward Bausch and Henry F. Kurtz, Rochester, N. Y., assignors to Bausch & Lomb Optical Company, Rochester, N. Y., a corporation of New York Application June 18, 1931. Serial No. 545,212

5 Claims. (Cl. 88—24)

This invention relates to optical instruments and more particularly it has reference to an apparatus which can be used for measuring, gaging and inspecting screw threads, gears, pinions and other objects by projecting onto a screen or chart an image of the profile or contour of the object.

One of the objects of this invention is to provide an improved means for measuring, gaging and inspecting screws, gears and other objects by projecting onto a chart or screen an image of the profile or contour of the screw, gear or other object. Another object is to provide an efficient and convenient means for projecting onto a screen an enlarged image of the contour or profile of an object. Still another object is to provide a device of the character described having a horizontal, transparent stage for holding the object under examination.

A further object is to provide an apparatus of the type described in which the image on the screen is neither inverted nor reverted. Another object is to provide an apparatus of the type described having a series of objective lenses, each lens of which is adapted to project an image having a different, fixed magnification.

A further object is to provide a projection apparatus of the character described which will have a relatively simple, rugged structure so that it can be used efficiently in a shop or factory by the average mechanic or factory worker. Still another object is to provide an apparatus of the type described having a series of objective lenses adapted for selective use and so arranged and constructed that different fixed magnifications can be selectively produced with a minimum amount of adjustment. These and other objects and advantages reside in certain features of construction, arrangement and combination of parts as will hereinafter be more fully described and pointed out in the appended claims.

Referring to the drawing:

Fig. 1 is a vertical sectional view, with parts in elevation, of a device embodying our invention.

Fig. 2 is a diagrammatic view showng the action of the right angle roof prism on light rays.

One embodiment of our invention is illustrated in the drawing wherein 10 indicates a supporting wall which may be secured to any suitable table or support. Fixedly mounted to the wall 10 is a tubular casing 11 which carries a light source such as an incandescent lamp 12 contained within the housing 13. Adjustably mounted within casing 11 is a condensing lens system 14 for producing parallel light rays which are reflected vertically by means of inclined reflector 15.

A tubular bushing 17 is movably mounted on wall 10 by means of two pairs of outwardly-projecting yieldable members 18. Secured to the wall 10 is a bracket 19 carrying an adjusting screw 20 which contacts with a lug 21 secured to bushing 17. It will therefore be apparent that the bushing member 17 can be moved up and down by means of the adjusting screw 20 and the co-acting yieldable members 18. Positioned on the bushing 17 is a transparent glass plate 22 which serves as a stage to support an object 23 in the path of light rays.

Within an opening 24 in wall 10 there is secured a tubular casing 25, to the end of which there is fastened a housing 26 carrying a roof prism 27. The housing 26 has a threaded portion 28 for detachably holding an objective lens 29. An opening 30 in casing 25 permits the insertion and removal of a tubular holder 31 carrying a diaphragm 32, or auxiliary lens elements, for a purpose that will hereinafter be described. Attached to the rear of wall 10 is a housing 33 which encloses the two inclined reflectors 34 and 35. At the front of the housing there is mounted a suitable image-receiving surface or screen 36 such as a sheet of ground glass or the like. A forwardly projecting hood 37 shields the screen from extraneous light and permits visual observation of the image projected onto the screen.

In use, the object 23, to be inspected or measured, is placed on the transparent stage plate 22 in the path of light rays which emanate from lamp 12 and are rendered parallel by the lens 14. The slight amount of focusing or adjusting which might be necessary is easily effected by adjusting screw 20. The light rays pass up through the objective lens 29, then enter the roof prism 27 and after reflection pass out to reflector 34 thence to reflector 35 and onto screen 36. The effect of the well known right angle roof prism on light rays is shown diagrammatically in Fig. 2. The roof prism 27 produces a left to right lateral change and the two reflectors 34 and 35 produce a change in a vertical plane so that the image seen on screen 36 is neither inverted nor reverted. In other words as the operator faces the apparatus a movement of the object 23 towards the left will cause the image on the screen to move towards the left and vice versa. Similarly, if the object 23 is moved on the stage 22 towards the operator the projected image on the screen 36 will move down and vice versa. This is an important feature of our invention as it eliminates the confusion which otherwise would result from viewing inverted or reverted images and hence it makes the device especially adaptable for shop and factory use. Another feature of our invention resides in the provision of a horizontal, transparent stage for use in supporting wheels, gears, machine parts and other objects which are to be inspected and gaged. The horizontal stage is exceedingly convenient to use and it eliminates complicated holding devices and attachments.

One of the very important features of our invention is the provision of a series of objective lenses which can be selectively used in order to produce images of different fixed magnifications. Hence, it is possible to supply a series of lenses which can be selectively used to produce images having magnifications of 10, 25, 50 and 100 diameters, for example. To accomplish this in a simple way, the casing 25, to which the objective lenses are secured by threads 28, is fixedly and immovably positioned with respect to the screen 36. Each objective lens of the series will therefore be fixedly and definitely secured to the casing 25 when in use so that when the object 23 is focused by means of screw 20 the projected image will always have a fixed, definite magnification which will depend upon the particular lens that is used.

Thus, the mere exchanging of objective lenses is the only operation necessary to change magnification and no other operations or adjustments of the optical system are necessary. In the prior art instruments of this type, of which we are aware, a change in magnification requires an adjustment of the optical system after the objective lenses have been changed. This adjustment of the optical system is entirely eliminated in our apparatus and hence our device can be conveniently and easily used to produce different magnifications.

In actual practice the various objective lenses would be clearly marked with suitable indicia to indicate their powers so that various magnifications could be readily obtained by merely changing lenses. Since the various lenses produce definite, fixed magnifications, it is possible to actually measure the projected image and calculate the actual dimensions of the object. When employing objective lenses of certain powers, some of the lens elements of the objective are mounted in a removal tubular holder 31 so that two separate mountings must be removed in changing to other powers. However, the mounts of the objective lenses always occupy fixed positions so that the important feature of maintaining definite, fixed magnification is retained.

Instead of viewing the projected images on screen 36 it is possible to replace the screen 36 with a plate holder so that the image may be photographically recorded on a sensitized plate.

From the foregoing it will be apparent that we are able to attain the objects of our invention and provide an apparatus which can be used in shop or factory for measuring, gaging and inspecting wheels, gears, small machine parts and other objects. A horizontal stage affords great convenience in use; the projected images as viewed on the screen are neither inverted nor reverted so that confusion in operation is eliminated and definite, fixed magnifications are provided by the selective use of a series of objective lenses. All of these features tend to make our apparatus especially adaptable for shop and factory use. Various modifications can obviously be made without departing from the spirit of our invention as pointed out in the appended claims.

We claim:

1. An apparatus of the type described comprising means for producing a beam of light rays, a stage for holding an object in the path of said light rays, a screen, an objective lens for projecting an image of said object upon said screen and means in the optical path for inverting and reverting the projected image.

2. A projection apparatus of the type described comprising means for producing a vertical beam of parallel light rays, a horizontally disposed stage for holding an object in the path of said light rays, a vertically disposed image-receiving surface, an objective lens positioned above said object, a right-angled roof prism positioned above said objective and a pair of angularly disposed reflectors for receiving light rays from said prism and directing them onto said screen.

3. A projection apparatus comprising means for producing a substantially vertical beam of parallel light rays, a transparent stage for holding an object, said stage being horizontally positioned in the path of said light rays, a vertically disposed screen, an objective lens positioned above said stage for projecting an image of said object onto said screen and reflecting means in the optical path between said lens and screen for inverting and reverting the image formed by said lens on the screen.

4. A projection apparatus for gaging and measuring objects, said apparatus comprising a support, means on said support for producing a vertical beam of light rays, a horizontal stage adjustably mounted on said support for holding an object in the path of light rays, a holder fixedly mounted on said support above said stage, lens means carried by said holder, a vertical screen mounted on said support above said holder, a reflector above said lens means and reflecting means positioned laterally from said support for reflecting onto said screen light rays which pass through said lens means.

5. A projecting apparatus for gaging and measuring objects comprising a support, means on said support for producing a vertical beam of light rays, a horizontally disposed stage adjustably monuted on said support for holding objects to be gaged in said beam, a holder mounted on said support above said stage, lens means mounted on said holder, a vertically positioned screen mounted above said holder, two angularly disposed reflectors laterally positioned opposite said holder and reflecting means positioned above said lens means for laterally deflecting light rays onto said reflectors whereby they are successively reflected and directed onto said screen.

EDWARD BAUSCH.
HENRY F. KURTZ.